(12) United States Patent
Senga et al.

(10) Patent No.: US 10,099,414 B2
(45) Date of Patent: Oct. 16, 2018

(54) MOLD CLAMPING DEVICE OF INJECTION MOLDING MACHINE

(71) Applicant: FANUC CORPORATION, Yamanashi (JP)

(72) Inventors: Masatoshi Senga, Yamanashi-ken (JP); Kouichi Nishimura, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/687,577

(22) Filed: Aug. 28, 2017

(65) Prior Publication Data

US 2018/0056564 A1    Mar. 1, 2018

(30) Foreign Application Priority Data

Aug. 29, 2016   (JP) ................................ 2016-166823

(51) Int. Cl.
   *B29C 45/66* (2006.01)
   *B29C 45/17* (2006.01)

(52) U.S. Cl.
   CPC ............ *B29C 45/661* (2013.01); *B29C 45/66* (2013.01); *B29C 2045/1792* (2013.01)

(58) Field of Classification Search
   CPC ................... B29C 45/66; B29C 45/661; B29C 2045/1792; B29C 2045/1793
   See application file for complete search history.

(56) References Cited

U.S. PATENT DOCUMENTS

| | | | |
|---|---|---|---|
| 6,561,785 B1 * | 5/2003 | Morita | B29C 45/66 425/150 |
| 9,566,734 B2 * | 2/2017 | Yano | B29C 45/5008 |
| 2016/0096301 A1 | 4/2016 | Yano et al. | |
| 2017/0106576 A1 * | 4/2017 | Yang | B29C 45/661 |

FOREIGN PATENT DOCUMENTS

| | | |
|---|---|---|
| JP | 2010-89295 A | 4/2010 |
| JP | 2012-166530 A | 9/2012 |
| JP | 2016-74109 A | 5/2016 |

* cited by examiner

*Primary Examiner* — James P Mackey
(74) *Attorney, Agent, or Firm* — Hauptman Ham, LLP

(57) ABSTRACT

A mold clamping device of an injection molding machine supports a motor fixing member configured to fix a mold opening/closing motor to a rear platen, on a base frame through a support member and slide plates. When viewed from a direction of a drive shaft of the mold opening/closing motor, the width of the support member is formed to progressively increase outwardly from the motor fixing member toward the base frame, and on a portion of the support member that is located on the base frame side, the slide plates are provided at at least both ends of the portion in a width direction of the support member.

3 Claims, 6 Drawing Sheets

MOLD CLAMPING DEVICE OF INJECTION MOLDING MACHINE

CROSS-REFERENCE TO RELATED APPLICATION

This application is based upon and claims the benefit of priority from Japanese Patent Application No. 2016-166823 filed on Aug. 29, 2016, the contents of which are incorporated herein by reference.

BACKGROUND OF THE INVENTION

Field of the Invention

The present invention relates to a mold clamping device of an injection molding machine.

Description of the Related Art

A mold clamping device of an injection molding machine includes a drive motor that moves a moving platen with respect to a rear platen. The drive motor is attached to the rear platen with a fixing member interposed therebetween. The fixing member receives a reaction force of the drive motor, and therefore tends to vibrate in a rotation direction of the drive motor. When the fixing member vibrates, the entire drive motor vibrates, and the moving platen also vibrates. As a result, a movable mold also vibrates. Hence, it is considered that a base frame on which the mold clamping device is installed receives the reaction force of the drive motor. As a structure that supports the drive motor on the base frame, the following techniques are developed.

Japanese Laid-Open Patent Publication No. 2010-089295 discloses a technique of supporting a drive device attached to a back platen, on a machine base by using elastic members.

Japanese Laid-Open Patent Publication No. 2016-074109 discloses a technique of using a motor fixing member support member to support a motor fixing member that fixes a drive motor to a rear plate. According to this technique, distal ends of bolts screw-engaged with the motor fixing member abut on the motor fixing member support member.

SUMMARY OF THE INVENTION

However, since the technique disclosed in Japanese Laid-Open Patent Publication No. 2010-089295 supports the drive device by using the elastic members, it is not possible to suppress vibration of the drive device in a rotation direction thereof. Therefore, there is concern that the vibration may be transmitted to the back platen and the back platen may vibrate in the rotation direction.

According to the technique disclosed in Japanese Laid-Open Patent Publication No. 2016-074109, the distal ends of the bolts screw-engaged with the motor fixing member only abut on the motor fixing member support member. Thus, the motor fixing member is not fixed to the motor fixing member support member. Therefore, the motor fixing member support member cannot suppress the vibration of the motor fixing member.

The present invention has been made to solve the above problem, and an object of the present invention is to provide a mold clamping device of an injection molding machine that can suppress vibration of a fixing member caused by driving and rotating a drive motor.

A mold clamping device of an injection molding machine according to the present invention includes: a stationary platen fixed to a base frame and configured to hold a fixed mold; a rear platen movably provided on the base frame; a plurality of tie bars configured to couple the stationary platen and the rear platen, and arranged in parallel to each other; a moving platen provided between the stationary platen and the rear platen so as to be movable along the tie bars, and configured to hold a movable mold facing toward the fixed mold; a drive motor configured to move the moving platen; a fixing member provided between the drive motor and the rear platen and configured to fix the drive motor to the rear platen; a support member coupled to the fixing member and configured to support the fixing member with respect to the base frame; and movable support members configured to support the support member with respect to the base frame movably in a movement direction of the moving platen, and when viewed from a direction of a rotation axis of the drive motor, a width of the support member is formed to progressively increase outwardly from the fixing member toward the base frame, and the movable support members are provided on a portion of the support member that is located on a side of the base frame, at at least both ends of the portion in a width direction of the support member.

A reaction force of the drive motor transmitted to the fixing member is transmitted to the movable support members via the support member. At positions of the movable support members, the reaction force of the drive motor includes a gravity direction component. The reaction force of the drive motor can be transmitted from the movable support members to the base frame, and thus the base frame can receive the reaction force of the drive motor. Therefore, it is possible to suppress vibration of the fixing member.

In the mold clamping device of the injection molding machine according to the present invention, when viewed from the direction of the rotation axis of the drive motor, a width of the support member on a side of the base frame may be greater than a center distance between the tie bars that are adjacent to each other in the width direction, and the movable support members may be arranged outside an area between the axes of the tie bars that are adjacent to each other in the width direction. Owing thereto, it is possible to increase the component of the reaction force of the drive motor that can be transmitted from the movable support members to the base frame, and suppress the vibration of the fixing member.

The mold clamping device of the injection molding machine according to the present invention may further include a coupling member configured to couple the fixing member and the support member, and the coupling member may include a jack-up bolt and a fixing bolt. The jack-up bolt is screw-engaged with the fixing member, and a distal end of the jack-up bolt abuts on a surface of the support member to thereby adjust a height of the fixing member with respect to the support member. The fixing bolt is inserted in a through-hole extending in the jack-up bolt in an axial direction thereof, and a distal end of the fixing bolt is screw-engaged with the support member. It is possible to adjust the height of the fixing member with respect to the support member by using the jack-up bolt, and transmit the reaction force of the drive motor from the fixing member to the support member by using the fixing bolt.

According to the present invention, it is possible to suppress vibration of the fixing member caused by driving and rotating the drive motor.

The above and other objects features and advantages of the present invention will become more apparent from the

DESCRIPTION OF THE PREFERRED EMBODIMENTS

Preferred embodiments of a mold clamping device of an injection molding machine according to the present invention will be described in detail below with reference to the accompanying drawings.

First Embodiment

[Configuration of Injection Molding Machine]

Figure 1:
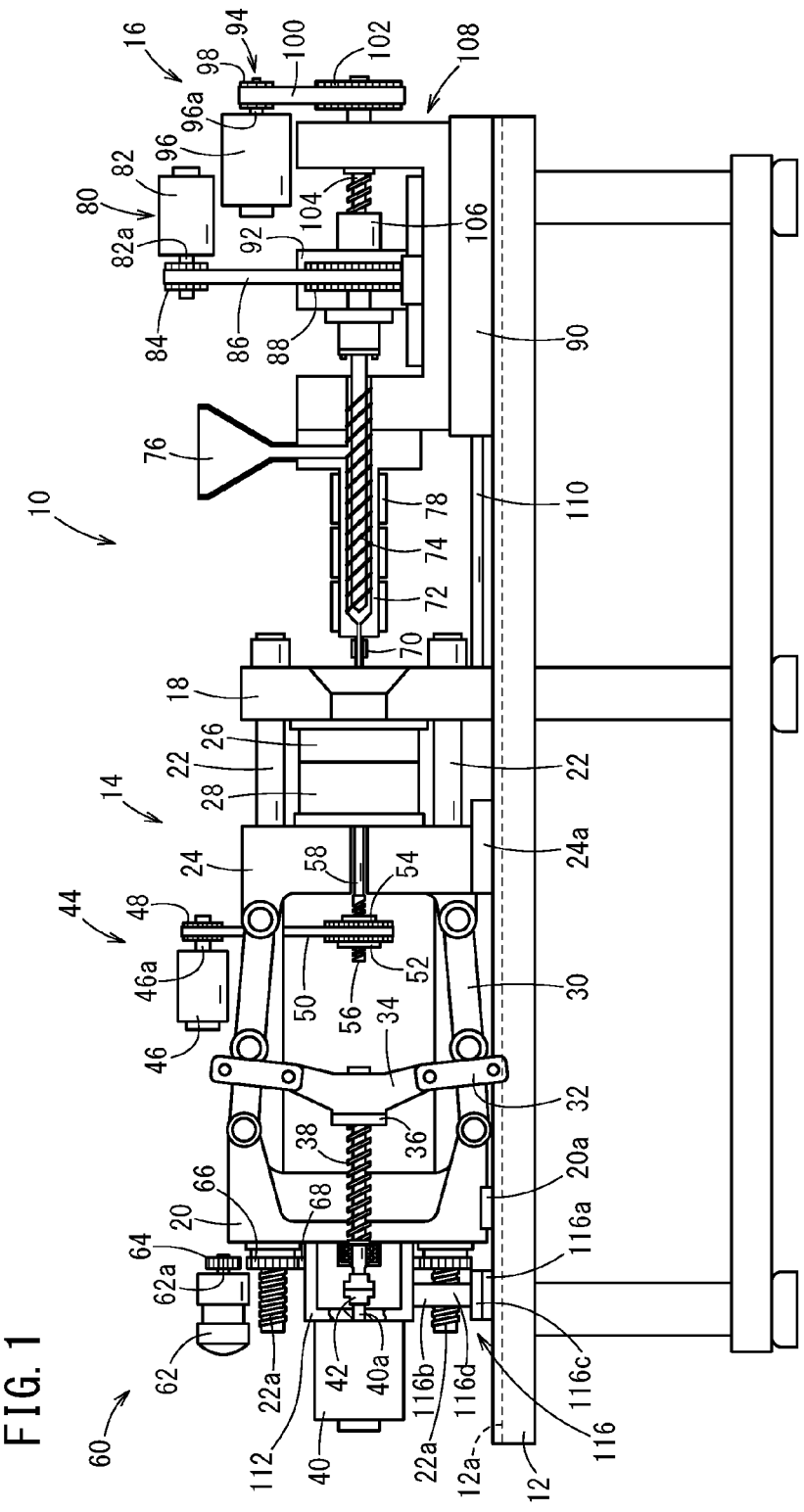
FIG. 1 is a view schematically showing an external appearance configuration of an injection molding machine according to a first embodiment of the present invention.

FIG. 1 is a view schematically showing an external appearance configuration of an injection molding machine 10. The injection molding machine 10 includes a base frame 12, and a mold clamping device 14 and an injection device 16 that are installed on the base frame 12.

(Configuration of Mold Clamping Device)

The mold clamping device 14 includes a stationary platen 18, a rear platen 20, and four tie bars 22. The tie bars 22 couple the stationary platen 18 and the rear platen 20. The tie bars 22 are disposed in parallel to each other. A moving platen 24 is arranged between the stationary platen 18 and the rear platen 20. On the base frame 12, grooves 12a are formed in left and right directions in FIG. 2. The plurality of (two in the present embodiment) grooves 12a are spaced from each other in a width direction of the base frame 12. The stationary platen 18 is unmovably fixed onto the base frame 12. The rear platen 20 is installed on the base frame 12 through a slide plate 20a. The slide plate 20a engages with the grooves 12a of the base frame 12. The rear platen 20 is movable on the base frame 12 along the grooves 12a. The moving platen 24 is installed on the base frame 12 through a slide plate 24a. The slide plate 24a engages with the grooves 12a of the base frame 12. The moving platen 24 is movable on the base frame 12 along the grooves 12a. A mold clamping space is formed between the stationary platen 18 and the moving platen 24. A fixed mold 26 is attached to the stationary platen 18 on a side which faces toward the moving platen 24. A movable mold 28 is attached to the moving platen 24 on a side which faces toward the stationary platen 18.

A toggle link (link) 30 is arranged between the rear platen 20 and the moving platen 24. The toggle link 30 is connected with a crosshead 34 via crosslinks 32. A ball screw nut 36 is coupled to the crosshead 34. A ball screw shaft 38 is screw-engaged with the ball screw nut 36. The ball screw shaft 38 is rotatably supported on the rear platen 20 but movement thereof in an axis direction is restricted.

To an end portion of the ball screw shaft 38 on an opposite side of another end portion thereof which is screw-engaged with the ball screw nut 36, a drive shaft 40a of a mold opening/closing motor (drive motor) 40 for rotating the ball screw shaft 38 is coupled. The ball screw shaft 38 and the drive shaft 40a are directly coupled coaxially through a coupling 42. This structure will be referred to as a direct coupling structure. In the direct coupling structure, inertia is smaller than that in a structure in which the ball screw shaft 38 and the drive shaft 40a are coupled to each other by a pulley and a belt. Hence, even when the mold opening/closing motor 40 of a relatively small torque is used, it is possible to immediately stop rotation of the ball screw shaft 38 after rotating the ball screw shaft 38 at a high speed, and immediately start rotating the ball screw shaft 38 at a high speed from a stop state.

By driving the mold opening/closing motor 40, the ball screw shaft 38 rotates (normally rotates or reversely rotates). As a result of the rotation of the ball screw shaft 38, the crosshead 34 coupled to the ball screw nut 36 moves forward or backward (rightward or leftward in FIG. 1) on the ball screw shaft 38. By the movement of the crosshead 34, the moving platen 24 is moved forward or backward (rightward or leftward in FIG. 1) along the tie bars 22 through the crosslinks 32 and the toggle link 30.

When the moving platen 24 moves forward, the movable mold 28 is made to abut against the fixed mold 26, whereby a mold is closed. When the moving platen 24 moves backward, the movable mold 28 is separated away from the fixed mold 26, whereby the mold is opened.

The mold clamping device 14 includes an ejector mechanism 44. The ejector mechanism 44 is a mechanism for ejecting a molded article from the movable mold 28. The ejector mechanism 44 includes an ejector motor 46, a drive pulley 48, a belt 50, a driven pulley 52, a ball screw nut 54, a ball screw shaft 56 and an ejector pin 58.

A drive shaft 46a of the ejector motor 46 is provided with the drive pulley 48 that rotates integrally with the drive shaft 46a. The belt 50 is wound between the drive pulley 48 and the driven pulley 52. At an inner circumferential side of the driven pulley 52, the ball screw nut 54 that rotates integrally with the driven pulley 52 is arranged. The ball screw shaft 56 is screw-engaged with the ball screw nut 54. The ejector pin 58 is coupled to a distal end of the ball screw shaft 56. Part of a distal end side of the ejector pin 58 is inserted in the movable mold 28.

By driving the ejector motor 46, the ball screw nut 54 is rotated (normally rotated or reversely rotated) through the drive pulley 48, the belt 50 and the driven pulley 52. As a result of the rotation of the ball screw nut 54, the ball screw shaft 56 moves forward or backward (rightward or leftward in FIG. 1). Accompanying the movement of the ball screw shaft 56, the ejector pin 58 moves forward or backward. When the ejector pin 58 moves forward (rightward in FIG. 1), a molded article is pushed out from the movable mold 28, so that the molded article is ejected from the movable mold 28.

The mold clamping device 14 includes a mold height adjustment mechanism 60. The mold height adjustment mechanism 60 is a mechanism for moving the rear platen 20 in forward and backward directions (the left and right directions in FIG. 1) depending on the height of the fixed mold 26 and the movable mold 28. The mold height adjustment mechanism 60 includes a mold height adjustment motor 62, a drive gear 64, nut gears 66 and a ring gear 68.

A drive shaft 62a of the mold height adjustment motor 62 is provided with the drive gear 64 that rotates integrally with the drive shaft 62a. The drive gear 64 is enmeshed with the nut gear 66. Each nut gear 66 is screw-engaged with a screw portion 22a formed at a distal end of each tie bar 22. The nut gears 66 are enmeshed with the ring gear 68. The ring gear 68 is disposed in an area surrounded by the four tie bars 22, and is enmeshed with the nut gears 66 with which the screw portions 22a of the tie bars 22 are screw-engaged.

By driving the mold height adjustment motor 62, the nut gears 66 are rotated (normally rotated or reversely rotated) through the drive gear 64. The nut gears 66 provided to the respective tie bars 22 are enmeshed with the ring gear 68, and therefore rotate in synchronization. Accompanying the rotation of the nut gears 66, the rear platen 20 moves forward or backward (rightward or leftward in FIG. 1). The moving platen 24 moves accompanying the movement of the rear platen 20, so that it is possible to adjust a distance between the moving platen 24 and the stationary platen 18 depending on the height of the fixed mold 26 and the movable mold 28.

(Configuration of Injection Device)

The injection device 16 includes a nozzle 70, a cylinder 72, a screw 74, a hopper 76 and a heater 78. The nozzle 70 is provided at a distal end of the cylinder 72. The cylinder 72 is a hollow member, and the screw 74 is inserted in the cylinder 72. The cylinder 72 is connected with the hopper 76. A resin material is loaded from the hopper 76, and the loaded resin material is fed in the cylinder 72. The heater 78 is arranged on an outer circumference of the cylinder 72. When the resin material loaded from the hopper 76 is in the form of pellet, the heater 78 melts the resin material. In this regard, the resin material loaded from the hopper 76 may be molten resin.

The injection device 16 includes a screw drive mechanism 80. The screw drive mechanism 80 is arranged on a push plate 92. The push plate 92 is provided on an extruder base 90 movably in the forward and backward directions (the left and right directions in FIG. 1). The screw drive mechanism 80 is a mechanism for rotating the screw 74. The screw drive mechanism 80 includes a screw drive motor 82, a drive pulley 84, a belt 86 and a driven pulley 88.

A drive shaft 82a of the screw drive motor 82 is provided with the drive pulley 84 that rotates integrally with the drive shaft 82a. The belt 86 is wound between the drive pulley 84 and the driven pulley 88. The driven pulley 88 rotates integrally with the screw 74.

By driving the screw drive motor 82, the screw 74 is rotated through the drive pulley 84, the belt 86 and the driven pulley 88. As a result of the rotation of the screw 74, the resin material loaded from the hopper 76 is fed toward the nozzle 70.

The injection device 16 includes an injection mechanism 94. The injection mechanism 94 is provided on the extruder base 90. The injection mechanism 94 is a mechanism for injecting the resin material from the nozzle 70. The injection mechanism 94 includes an injection motor 96, a drive pulley 98, a belt 100, a driven pulley 102, a ball screw shaft 104, and a ball screw nut 106.

A drive shaft 96a of the injection motor 96 is provided with the drive pulley 98 that rotates integrally with the drive shaft 96a. The belt 100 is wound between the drive pulley 98 and the driven pulley 102. The driven pulley 102 rotates integrally with the ball screw shaft 104. The ball screw nut 106 is coupled to the push plate 92. The ball screw shaft 104 is screw-engaged to the ball screw nut 106.

By driving the injection motor 96, the ball screw shaft 104 is rotated through the drive pulley 98, the belt 100 and the driven pulley 102. As a result of the rotation of the ball screw shaft 104, the push plate 92 coupled to the ball screw nut 106 is moved forward or backward (leftward or rightward in FIG. 1) on the ball screw shaft 104. When the push plate 92 moves, the screw 74 is moved forward or backward (leftward or rightward in FIG. 1) in the cylinder 72. By the forward movement of the screw 74 in the cylinder 72, the resin material stored at a distal end portion of the cylinder 72 is injected from the nozzle 70.

The injection device 16 includes a nozzle touch mechanism 108. The nozzle touch mechanism 108 is a mechanism for moving the entire injection device 16 forward or backward (leftward or rightward in FIG. 1) with respect to the base frame 12.

The nozzle touch mechanism 108 includes the extruder base 90, a nozzle touch motor (not shown), and a ball screw shaft 110. The extruder base 90 is provided movably forward or backward (leftward or rightward in FIG. 1) on the base frame 12. The ball screw shaft 110 is coupled to a drive shaft of the nozzle touch motor. By driving the nozzle touch motor, the ball screw shaft 110 is rotated (normally rotated or reversely rotated). As a result of the rotation of the ball screw shaft 110, the extruder base 90 is moved forward or backward (leftward or rightward in FIG. 1). When the extruder base 90 moves forward (leftward in FIG. 1), the distal end of the nozzle 70 is pushed against the fixed mold 26.

[Configurations of Motor Fixing Member and Support Member]

Figure 2:
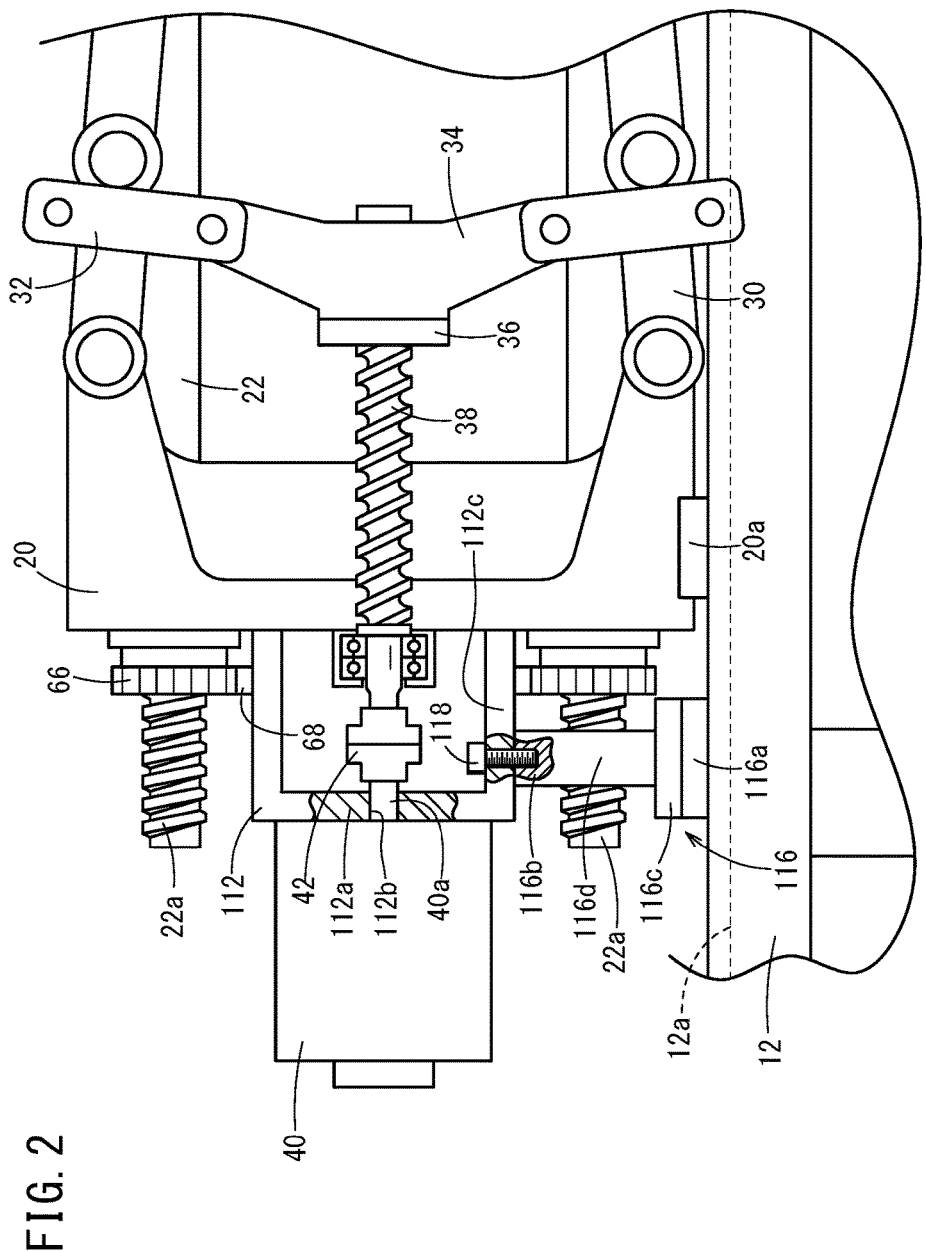
FIG. 2 is an enlarged view showing a vicinity of a rear platen of a mold clamping device according to the first embodiment.
Figure 3:
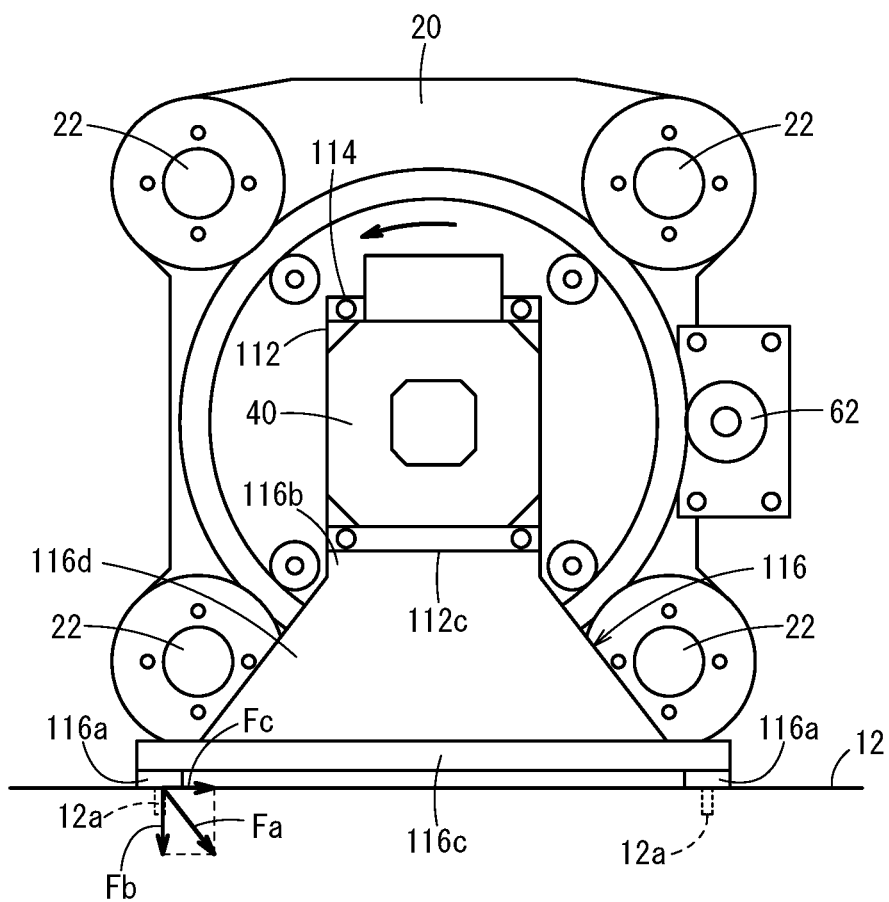
FIG. 3 is a view showing the rear platen according to the first embodiment as viewed from a mold opening/closing motor side.

FIG. 2 is an enlarged view showing a vicinity of the rear platen 20 of the mold clamping device 14. FIG. 3 is a view showing the rear platen 20 as viewed from the mold opening/closing motor 40 side (in a direction of the drive shaft 40a of the mold opening/closing motor 40). In FIG. 3, the nut gears 66 and the ring gear 68 are covered with a cover and therefore are not shown. In FIG. 2, the illustration of the mold height adjustment motor 62 is omitted. Since FIG. 1 schematically shows a position of the mold height adjustment motor 62, the position of the mold height adjustment motor 62 differs between FIGS. 1 and 3.

The mold opening/closing motor 40 is fixed to the rear platen 20 through a motor fixing member (fixing member) 112. The motor fixing member 112 is formed into a bottomed cup shape. The motor fixing member 112 is fixed to the rear platen 20. The mold opening/closing motor 40 is fixed to a bottom portion 112a of the motor fixing member 112 by bolts 114. A through-hole 112b is formed in the bottom portion 112a. The drive shaft 40a of the mold opening/closing motor 40 is inserted in the through-hole 112b, and a distal end of the drive shaft 40a enters the motor fixing member 112. The drive shaft 40a is coupled to the coupling 42 in the motor fixing member 112.

A support member 116 is fixed to a lower wall 112c of the motor fixing member 112 by bolts 118. The support member 116 is installed on the base frame 12 through slide plates (movable support members) 116a. The slide plates 116a are engaged with the grooves 12a of the base frame 12. The support member 116 is movable forward or backward (rightward or leftward in FIG. 1) along the grooves 12a on the base frame 12.

When the support member 116 is viewed from a direction of the drive shaft 40a of the mold opening/closing motor 40, the support member 116 is formed into a substantially trapezoidal shape (see FIG. 3). That is, the support member 116 is formed such that the width (the length in the left and right directions in FIG. 3) thereof is progressively increased outwardly from a portion of the support member 116 (hereinafter referred to as an upper portion 116*b*) that is coupled to the motor fixing member 112 toward another portion of the support member 116 (hereinafter referred to as a lower portion 116*c*) that is located closer to the base frame 12. An intermediate portion 116*d* between the upper portion 116*b* and the lower portion 116*c* of the support member 116 is located between the axes of the tie bars 22, 22 that are adjacent to each other in the width direction. Both sides of the intermediate portion 116*d* in the width direction are formed into substantially straight line shapes from the upper portion 116*b* to the lower portion 116*c*. The width of the lower portion 116*c* of the support member 116 is longer than a center distance of the tie bars 22, 22 that are adjacent to each other in the width direction. The slide plates 116*a* are provided at two locations in the width direction of the support member 116. The slide plates 116*a* are disposed outward beyond the axes of the tie bars 22, 22 that are adjacent to each other in the width direction.

[Operation and Effect]

Figure 4:
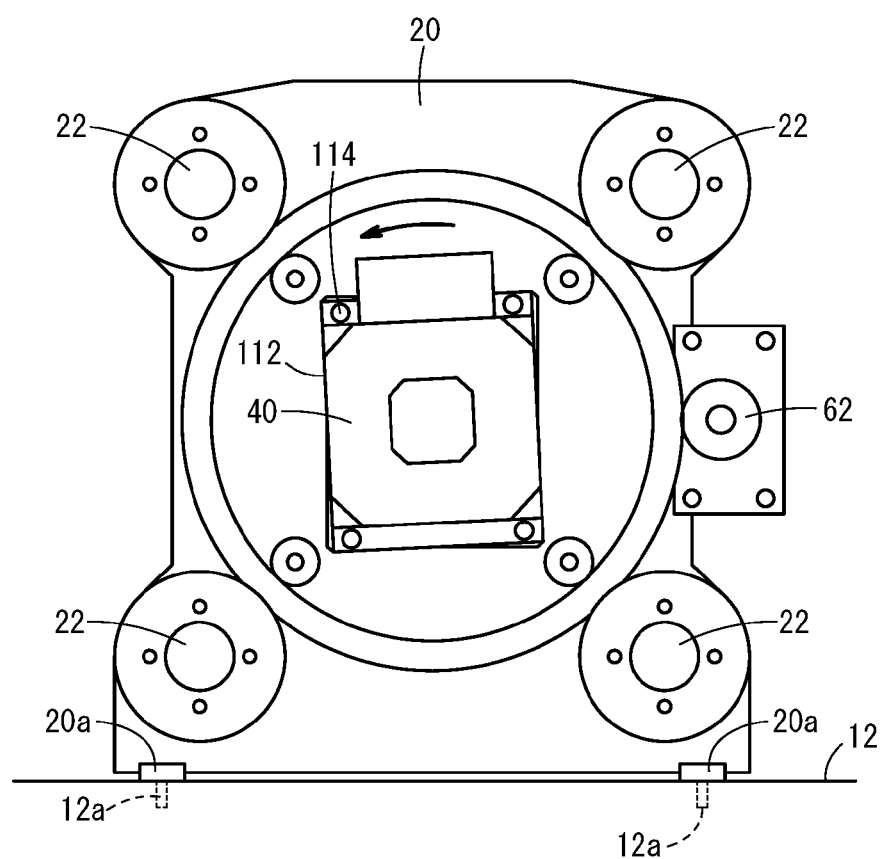
FIG. 4 is a view showing a rear platen according to a comparative example as viewed from a mold opening/closing motor side.

FIG. 4 is a view showing the rear platen 20 as viewed from the mold opening/closing motor 40 side (in a direction of the drive shaft 40*a* of the mold opening/closing motor 40). Unlike the first embodiment, the support member 116 is not provided in FIG. 4.

The mold opening/closing motor 40 is fixed to the rear platen 20 by using the motor fixing member 112. When the mold opening/closing motor 40 is driven, the reaction force of the mold opening/closing motor 40 is received by the motor fixing member 112. Hence, the motor fixing member 112 deforms in a rotation direction of the mold opening/closing motor 40, and the motor fixing member 112 vibrates in the rotation direction of the mold opening/closing motor 40. Since the mold opening/closing motor 40 is fixed to the motor fixing member 112, by the vibration of the motor fixing member 112, the entire mold opening/closing motor 40 also vibrates. This vibration is transmitted as vibration in the rotation direction to the ball screw shaft 38, too. The vibration of the ball screw shaft 38 in the rotation direction is converted into vibration of the ball screw nut 36 in the forward and backward directions, and the moving platen 24 and the movable mold 28 is caused to vibrate in the forward and backward directions via the crosshead 34, the crosslinks 32 and the toggle link 30.

In order to suppress the vibration of the motor fixing member 112, enhanced rigidity of the motor fixing member 112 can be considered. The coupling 42 is provided in the motor fixing member 112. After the motor fixing member 112 is fixed to the rear platen 20, the coupling 42 is fastened. Thus, it is necessary to form holes in the motor fixing member 112 for performing an operation of fastening the coupling 42. Therefore, it is difficult to enhance the rigidity of the motor fixing member 112.

If the rigidity of the motor fixing member 112 is increased, the reaction force of the mold opening/closing motor 40 which is transmitted to the rear platen 20 is accordingly increased. Hence, it is concerned that the rear platen 20 rotates, and the moving platen 24 coupled to the rear platen 20 through the tie bars 22 also rotates. This causes a mold displacement between the movable mold 28 and the fixed mold 26.

Figure 5:
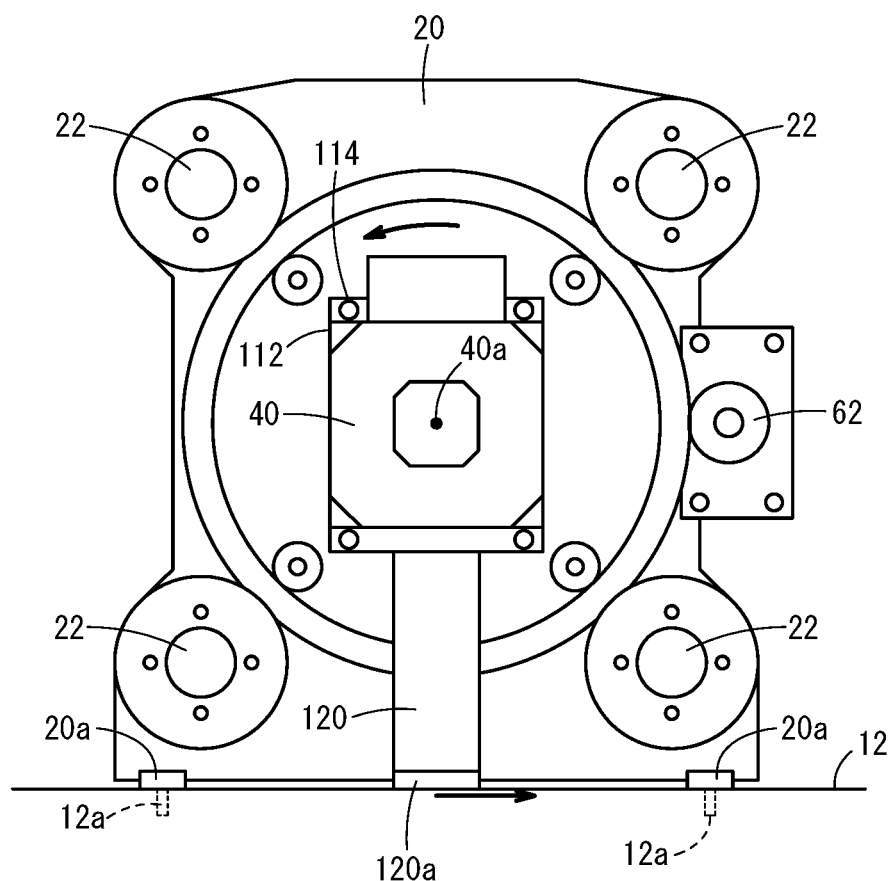
FIG. 5 is a view showing the rear platen according to another comparative example as viewed from a mold opening/closing motor side.

FIG. 5 is a view showing the rear platen 20 as viewed from the mold opening/closing motor 40 side (the direction of the drive shaft 40*a* of the mold opening/closing motor 40). Unlike the first embodiment, a support member 120 having a shape different from the support member 116 is provided in FIG. 5.

As another technique for suppressing vibration of the motor fixing member 112, provision of the support member 120 for receiving the reaction force of the mold opening/closing motor 40 that acts on the motor fixing member 112 can be thought. Similar to the support member 116 according to the first embodiment, the support member 120 is arranged on the base frame 12 with a slide plate 120*a* interposed therebetween. The support member 120 is movable forward or backward (rightward or leftward in FIG. 1) on the base frame 12. When the support member 120 is viewed from the direction of the drive shaft 40*a* of the mold opening/closing motor 40, the support member 120 is supported on the base frame 12 through the slide plate 120*a* directly below the drive shaft 40*a* of the mold opening/closing motor 40. It is assumed that the reaction force of the mold opening/closing motor 40 acts on the motor fixing member 112 counterclockwise in FIG. 5. In this case, a force in a right direction acts on the slide plate 120*a* of the support member 120 in FIG. 5.

The support member 120 needs to move in the forward and backward directions (a direction toward the front and the back in FIG. 5) together with the rear platen 20. Hence, the slide plate 120*a* cannot be fixed to the base frame 12. Therefore, the slide plate 120*a* cannot sufficiently receive a force in a lateral direction (the left and right directions in FIG. 5). It is not possible to sufficiently transmit the reaction force of the mold opening/closing motor 40 from the slide plate 120*a* toward the base frame 12, and the vibration of the motor fixing member 112 cannot be suppressed.

In contrast to the above, in the first embodiment, when the support member 116 is viewed from the direction of the drive shaft 40*a* of the mold opening/closing motor 40, the support member 116 is formed such that a width thereof is progressively increased outwardly from the upper portion 116*b* to the lower portion 116*c* of the support member 116. The slide plates 116*a* are arranged at both end portions of the lower portion 116*c* of the support member 116 in the width direction.

It is assumed that the reaction force of the mold opening/closing motor 40 acts on the motor fixing member 112 counterclockwise in FIG. 3. In this case, a force Fa acts on the left slide plate 116*a* in a lower right direction in FIG. 3. This force Fa can be decomposed into a force Fb of a gravity direction component, and a force Fc of a horizontal direction component. The slide plates 116*a* can receive the force Fb of the gravity direction component, and can transmit the force Fb to the base frame 12. As shown in FIG. 5, compared to a case where the slide plate 120*a* supports the support member 120 directly below the drive shaft 40*a* of the mold opening/closing motor 40, it is possible to reduce the force Fc of the horizontal direction component, and suppress vibration of the motor fixing member 112 during driving of the mold opening/closing motor 40.

According to the first embodiment, compared to a case where the slide plate 120*a* is disposed directly below the drive shaft 40*a* of the mold opening/closing motor 40 as shown in FIG. 5, it is possible to lengthen a distance between a coupling portion of the motor fixing member 112 and the support member 116, and the slide plates 116*a*. Consequently, it is possible to reduce the magnitude of the reaction force (force Fa) of the mold opening/closing motor 40 in the slide plates 116*a*. By reducing the force Fa, it is possible to reduce also the force Fc of the horizontal direction component. Consequently, it is possible to suppress the vibration of the motor fixing member 112 during driving of the mold opening/closing motor 40.

The width of the upper portion 116b of the support member 116 is narrower than the width of the lower portion 116c. Consequently, it is possible to secure the strength against the reaction force of the mold opening/closing motor 40 of the support member 116, and suppress an increase in the weight of the mold clamping device 14 caused when the support member 116 is provided.

According to the first embodiment, when the support member 116 is viewed from the direction of the drive shaft 40a of the mold opening/closing motor 40, the width of the lower portion 116c of the support member 116 is formed to be longer than the center distance between the tie bars 22, 22 that are adjacent to each other in the width direction. The slide plates 116a are arranged outside an inter-axial portion (an area) between the axes of the tie bars 22, 22 that are adjacent to each other in the width direction. As the positions of the slide plates 116a are separated further from the position directly below the drive shaft 40a of the mold opening/closing motor 40 in the width direction (the left and right directions in FIG. 3), the gravity direction component of the reaction force of the mold opening/closing motor 40 becomes greater at the positions of the slide plates 116a. By arranging the positions of the slide plates 116a in the width direction at outer sides as much as possible within the width of the rear platen 20, it is possible to increase the component of the reaction force of the mold opening/closing motor 40 that is received by the slide plates 116a. Consequently, it is possible to suppress the vibration of the motor fixing member 112 during driving of the mold opening/closing motor 40.

Second Embodiment

Figure 6:
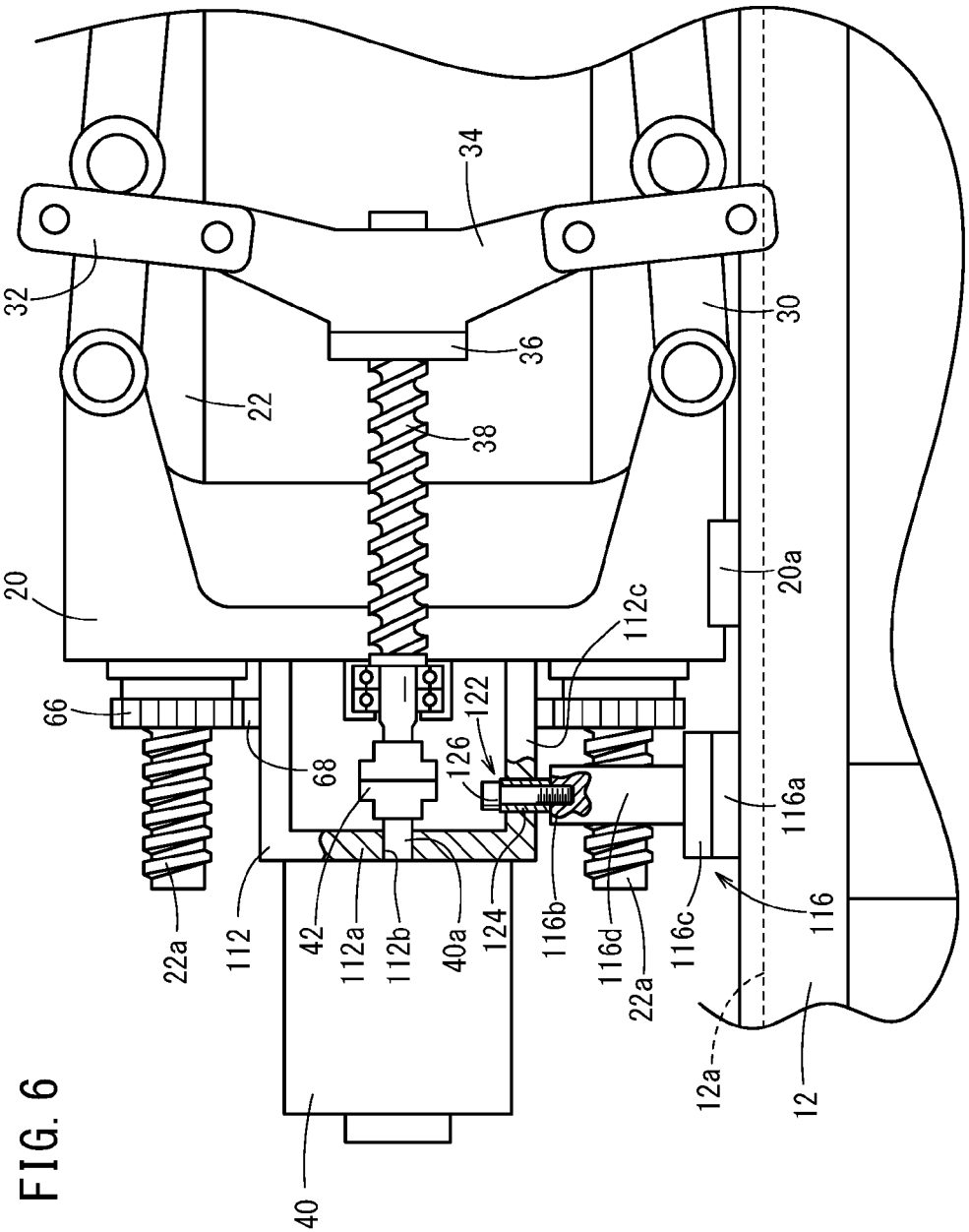
FIG. 6 is an enlarged view showing the vicinity of a rear platen of a mold clamping device according to a second embodiment of the present invention.

The mold clamping device 14 according to the second embodiment will be described. FIG. 6 is an enlarged view showing the vicinity of the rear platen 20 of the mold clamping device 14. In the mold clamping device 14 according to the first embodiment, the support member 116 is fixed to the motor fixing member 112 by the bolts 118. In the mold clamping device 14 according to the second embodiment, the support member 116 and the motor fixing member 112 are coupled to each other through a height adjustment mechanism (coupling member) 122. The same components as those in the first embodiment will be denoted by the same reference numerals, and descriptions thereof are omitted.

The height adjustment mechanism 122 includes a jack-up bolt 124 and a fixing bolt 126. The jack-up bolt 124 is a member of a cylindrical shape, and has a male screw formed on an outer circumferential surface thereof. The fixing bolt 126 is a headed bolt.

The jack-up bolt 124 is screw-engaged with the lower wall 112c of the motor fixing member 112. A distal end of the jack-up bolt 124 abuts on an upper surface of the support member 116. By adjusting a screwing amount of the jack-up bolt 124 with respect to the lower wall 112c, it is possible to adjust the height of the motor fixing member 112 with respect to the support member 116.

After the height is adjusted by the jack-up bolt 124, the fixing bolt 126 is inserted in a through-hole of the jack-up bolt 124 in the axial direction, and the fixing bolt 126 is screwed to the support member 116. By the fixing bolt 126, the reaction force of the mold opening/closing motor 40 that acts on the motor fixing member 112 is transmitted to the support member 116.

[Operation and Effect]

In some cases, the height of the drive shaft 40a of the mold opening/closing motor 40 and the height of the ball screw shaft 38 do not match up with each other. One of the causes is that, since there is a significant difference between the weight of the rear platen 20 and the weight of the mold opening/closing motor 40, the sunk amount of a portion of the base frame 12 that supports the rear platen 20 is different from the sunk amount of another portion of the base frame 12 that supports the mold opening/closing motor 40. Another cause is that machine accuracy errors of the members are accumulated.

The mold clamping device 14 according to the second embodiment includes the height adjustment mechanism 122 between the motor fixing member 112 and the support member 116. The jack-up bolt 124 of the height adjustment mechanism 122 makes it possible to adjust the height of the motor fixing member 112 with respect to the support member 116. Since the mold opening/closing motor 40 is fixed to the motor fixing member 112, the height of the motor fixing member 112 and also the height of the mold opening/closing motor 40 can be adjusted with respect to the support member 116. Consequently, it is possible to align the height of the drive shaft 40a of the mold opening/closing motor 40 with the height of the ball screw shaft 38.

Other Embodiments

The present invention has been described above based on the first embodiment and the second embodiment. However, the specific configuration of each invention is not limited to the first embodiment and the second embodiment. The present invention includes design changes without departing from the scope of the invention.

In the first embodiment and the second embodiment, the slide plates 116a are used as members for supporting the support member 116 movably with respect to the base frame 12. These components may be changed to linear guides or rollers.

In the first embodiment and the second embodiment, when the support member 116 is seen from the direction of the drive shaft 40a of the mold opening/closing motor 40, the support member 116 is formed into a substantially trapezoidal shape. The shape of the support member 116 is not limited in particular as long as the shape is such that the width of the support member 116 is progressively increased outwardly from the upper portion 116b toward the lower portion 116c.

What is claimed is:

1. A mold clamping device of an injection molding machine comprising:
    a stationary platen fixed to a base frame and configured to hold a fixed mold;
    a rear platen movably provided on the base frame;
    a plurality of tie bars configured to couple the stationary platen and the rear platen, and arranged in parallel to each other;
    a moving platen provided between the stationary platen and the rear platen so as to be movable along the tie bars, and configured to hold a movable mold facing toward the fixed mold;
    a drive motor configured to move the moving platen;
    a fixing member provided between the drive motor and the rear platen and configured to fix the drive motor to the rear platen;

a support member coupled to the fixing member and configured to support the fixing member with respect to the base frame; and movable support members configured to support the support member with respect to the base frame movably in a movement direction of the moving platen, wherein:

when viewed from a direction of a rotation axis of the drive motor, a width of the support member is formed to progressively increase outwardly from the fixing member toward the base frame; and the movable support members are provided on a portion of the support member that is located on a side of the base frame, at at least both ends of the portion in a width direction of the support member.

2. The mold clamping device of the injection molding machine according to claim 1, wherein, when viewed from the direction of the rotation axis of the drive motor, a width of the support member on a side of the base frame is greater than a center distance between the tie bars that are adjacent to each other in the width direction, and the movable support members are arranged outside an area between axes of the tie bars that are adjacent to each other in the width direction.

3. The mold clamping device of the injection molding machine according to claim 1, further comprising a coupling member configured to couple the fixing member and the support member, wherein the coupling member includes:

a jack-up bolt, wherein the jack-up bolt is screw-engaged with the fixing member, and a distal end of the jack-up bolt abuts on a surface of the support member to thereby adjust a height of the fixing member with respect to the support member; and a fixing bolt, wherein the fixing bolt is inserted in a through-hole extending in the jack-up bolt in an axial direction thereof, and a distal end of the fixing bolt is screw-engaged with the support member.

* * * * *